United States Patent
Wang

(10) Patent No.: US 11,619,747 B2
(45) Date of Patent: Apr. 4, 2023

(54) LOCATION MONITORING APPARATUSES CONFIGURED FOR LOW-POWER OPERATION

(71) Applicant: Chenyu Wang, Mountain View, CA (US)

(72) Inventor: Chenyu Wang, Mountain View, CA (US)

( * ) Notice: Subject to any disclaimer, the term of this patent is extended or adjusted under 35 U.S.C. 154(b) by 729 days.

(21) Appl. No.: 16/664,894

(22) Filed: Oct. 27, 2019

(65) Prior Publication Data
US 2020/0142078 A1    May 7, 2020

Related U.S. Application Data

(60) Provisional application No. 62/755,494, filed on Nov. 4, 2018.

(51) Int. Cl.
| | |
|---|---|
| G06G 7/70 | (2006.01) |
| G06G 7/76 | (2006.01) |
| G06G 1/00 | (2006.01) |
| G01S 19/34 | (2010.01) |
| G06Q 10/08 | (2023.01) |
| G01S 5/00 | (2006.01) |

(52) U.S. Cl.
CPC ............ *G01S 19/34* (2013.01); *G01S 5/0027* (2013.01); *G06Q 10/08* (2013.01)

(58) Field of Classification Search
CPC ......... H04M 2250/10; H04M 2250/12; H04W 52/283; G01S 5/0018; G01S 5/0027; G01S 5/0036; G01S 5/0063; G01S 19/31; G01S 19/32; G01S 19/33; G01S 19/34; G06Q 10/08
See application file for complete search history.

(56) References Cited

U.S. PATENT DOCUMENTS

| | | | |
|---|---|---|---|
| 2011/0134832 A1* | 6/2011 | Soliman | H04W 88/06 370/328 |
| 2012/0100869 A1 | 4/2012 | Liang et al. | |
| 2012/0161958 A1* | 6/2012 | Turon | G01S 19/34 340/539.3 |
| 2015/0082167 A1 | 3/2015 | Yeh et al. | |
| 2016/0125348 A1 | 5/2016 | Dyer et al. | |
| 2017/0011210 A1 | 1/2017 | Cheong et al. | |

(Continued)

*Primary Examiner* — Matthew W Genack
(74) *Attorney, Agent, or Firm* — Brian R. Short

(57) ABSTRACT

Methods, systems and apparatuses for location monitoring are disclosed. One system includes a first location monitoring apparatus that includes a plurality of sensors, shared storage, and a low-power controller. For an embodiment, the low-power controller operates to manage the plurality of sensors, manage storage of sensed information in the shared storage, communicate with an upstream server, and communicate with a second location monitoring apparatus. For an embodiment, a high-power controller operates to retrieve at least a portion of the stored sensed information, process the at least the portion of the stored sensed information, communicate with the low-power controller, and communicate with a second low-power controller of the second location monitoring apparatus through the low-power controller. For an embodiment, the low-power controller is powered and operable for greater periods of time than the high-power controller, and where the low-power controller.

19 Claims, 9 Drawing Sheets

(56) References Cited

U.S. PATENT DOCUMENTS

2017/0337033 A1    11/2017   Duyan et al.
2018/0027375 A1     1/2018   Pradeep
2018/0091939 A1     3/2018   Venkatraman et al.

* cited by examiner

LOCATION MONITORING APPARATUSES CONFIGURED FOR LOW-POWER OPERATION

RELATED PATENT APPLICATIONS

This patent application claims priority to U.S. Provisional Patent Application No. 62/755,494, filed Nov. 4, 2018, which is herein incorporated by reference.

FIELD OF THE DESCRIBED EMBODIMENTS

The described embodiments relate generally to location-based services. More particularly, the described embodiments relate to methods, systems and apparatuses for monitoring locations and conditions of objects, while maintaining control of power dissipated by location monitoring apparatuses.

BACKGROUND

It is difficult to track and monitor goods and people. The methods available require a trade-off between the accuracy of devices used to track and monitor, and the power consumed by the devices that track and monitor. It is desirable to have methods, systems and apparatuses for adaptively controlling a tradeoff between computational accuracy and power consumption of a mobile device that operates to select a condition of a subject or device.

SUMMARY

An embodiment includes a location monitoring system. For an embodiment, the location monitoring system includes a first location monitoring apparatus that includes a plurality of sensors, each of the plurality of sensors sensing a location or motion parameter to be utilized in estimating a location or task of an object the location monitoring apparatus is attached to, shared storage, and a low-power controller. For an embodiment, the low-power controller operates to manage the plurality of sensors, manage storage of sensed information in the shared storage, communicate with an upstream server, and communicate with a second location monitoring apparatus. For an embodiment, a high-power controller operates to retrieve at least a portion of the stored sensed information, process the at least the portion of the stored sensed information, communicate with the low-power controller, and communicate with a second low-power controller of the second location monitoring apparatus through the low-power controller. For an embodiment, the low-power controller is powered and operable for greater periods of time than the high-power controller, and wherein the low-power controller and the second low-power controller consume less power than the high-power controller.

An embodiment includes a method of location monitoring. The method including sensing a location or motion parameter, by a plurality of sensors of a first location monitoring apparatus, to be utilized in estimating a location or task of an object the first location monitoring apparatus is attached to, storing the location or motion parameter in shared storage, managing, by a low-power controller of the first location monitoring apparatus, the plurality of sensors, managing, by a low-power controller of the first location monitoring apparatus, storage of sensed information in the shared storage, communicating, by a low-power controller of the first location monitoring apparatus, with an upstream server, communicating, by a low-power controller of the first location monitoring apparatus, with a second location monitoring apparatus, retrieving, by a high-power controller of the first location monitoring apparatus, at least a portion of the stored sensed information, processing, by a high-power controller of the first location monitoring apparatus, the at least the portion of the stored sensed information, communicating, by a high-power controller of the first location monitoring apparatus, with the low-power controller, and communicating, by a high-power controller of the first location monitoring apparatus, with a second low-power controller of the second location monitoring apparatus through the low-power controller, wherein the low-power controller is powered and operable for greater periods of time than the high-power controller, and wherein the low-power controller and the second low-power controller consume less power than the high-power controller.

Other aspects and advantages of the described embodiments will become apparent from the following detailed description, taken in conjunction with the accompanying drawings, illustrating by way of example the principles of the described embodiments.

DETAILED DESCRIPTION

The embodiments described include methods, apparatuses, and systems for a plurality of location monitoring apparatuses. For an embodiment, a low-power controller and high-power controller operate together to monitor and control sensing by multiple sensors within a location monitoring apparatus. Further, for at least some embodiment, a single high-power controller operates together with multiple low-power controllers of multiple location monitoring apparatuses. For an embodiment, the low-power controllers control activation of the high-power controller. For an embodiment, the high-power controller aid in location, motion, and/or motion pattern processing of information sensed by multiple sensors of the low-power controllers.

Figure 1:
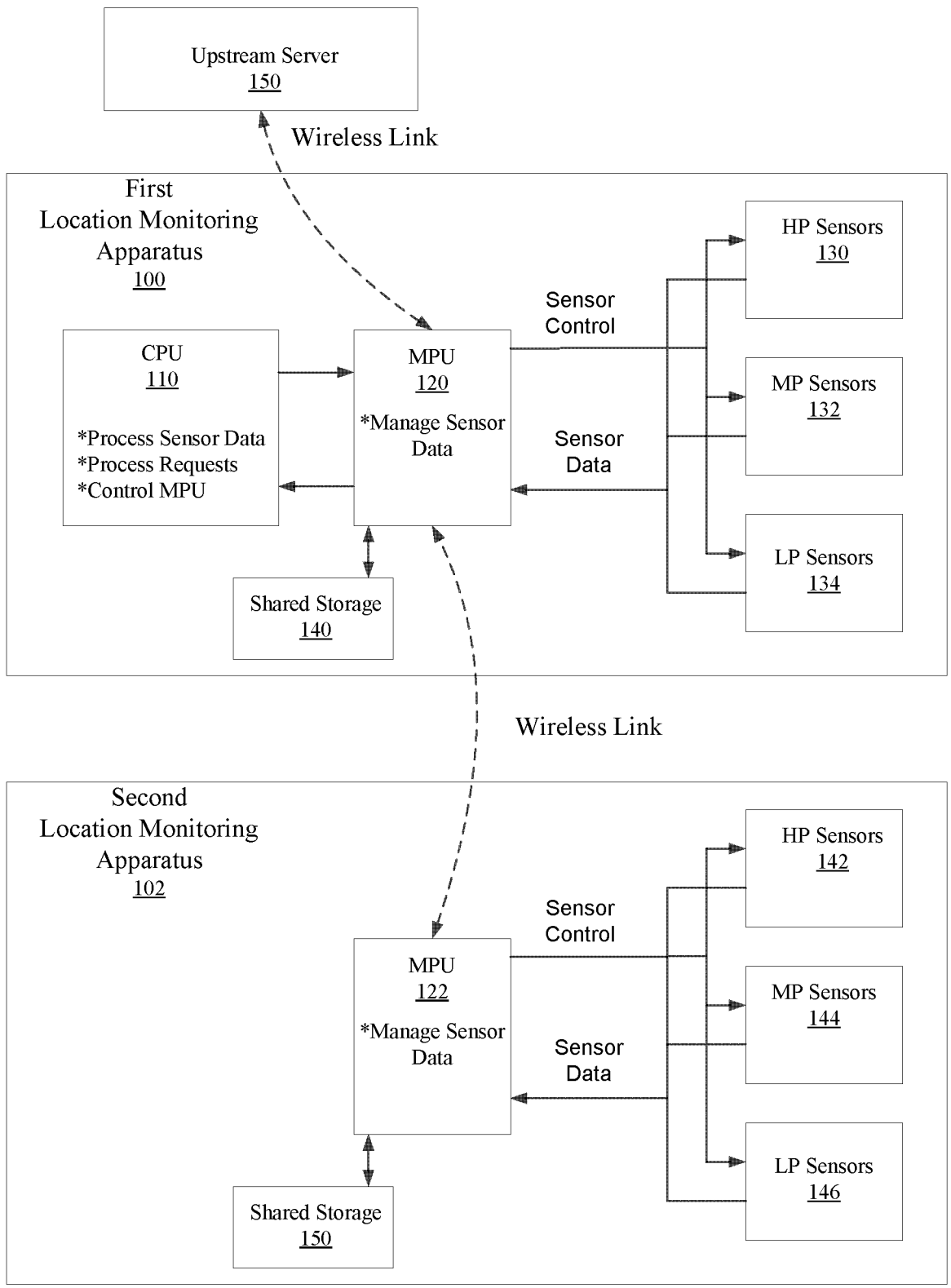
FIG. 1 shows location monitoring apparatuses that are network connected to an upstream server, according to an embodiment.

FIG. 1 shows location monitoring apparatuses 100, 102 that are network connected to an upstream server 150, according to an embodiment. As shown, a first location monitoring apparatus 100 includes a plurality of sensors, each of the plurality of sensors sensing a location or motion parameter to be utilized in estimating a location or task of an object the location monitoring apparatus is attached to. For an embodiment, the plurality of sensors includes high-power sensors 130, medium power sensors 132, and low-power sensors 134.

For an embodiment, the first location monitoring apparatus 100 further includes shared storage 140. For an embodiment, the shared storage 140 includes non-volatile memory that retains the information stored in it when power is off.

For at least some embodiments, the first location monitoring apparatus 100 includes a low-power controller (MPU) 120. For an embodiment, the first low-power controller 120 operates to manage the plurality of sensors 130, 132, 134, manage storage of sensed information of the plurality of sensors 130, 132, 134 in the shared storage 140, and communicate with the upstream server 150. For an embodiment, the plurality of sensors includes one or more high-power sensor(s) 130, one or more medium power(s) 132, and one or more low-power sensors 134. The low-power sensors 134 consume less power than both the medium power sensors 132 and the high-power sensor 130. The medium-power sensors consume less power than the high-power sensors 130.

In order to save power, the low-power controller 120 only activates the plurality of sensors as needed to determine locations and determine behavior of an object the first location monitoring apparatus is attached or associated with. For example, the low-power controller 120 will only activate the low-power sensors 134 if they are all that is needed to estimate the location and/or behavior. If more sensed information is needed, the medium-power sensors 132 can be activated. If more sensed information is needed, the high-power sensors 130 can be activated.

The low-power controller 120 manages the sensed location and motion information and determines when activate the different location and motion sensors 130, 132, 134. At least some embodiments include one or more of location monitoring apparatuses 100, 102 selecting a power mode for determining which of the plurality of sensors of the mobile device to activate. That is, a power mode associated with the activation of each of the low-power, medium-power, and high-power sensors 130. For at least some embodiments, the power modes include a sleep mode, a mid-power mode, and a high-power mode. For an embodiment, the mobile device cycles through the power modes. For at least some embodiments, at least one location monitoring device records and reports its state and location persistently, and will cycle through a sleep mode, a medium power mode, and a high-power mode.

For an embodiment, the sleep mode includes activation of one or more motion sensors, and for an embodiment, includes sensing and recording reception of wireless signatures. For at least some embodiments, the sleep mode uses a minimal amount of power, but sensed signals of the low-power mode can activate the location monitoring apparatus to activate high-power sensors 132, 134. For processing greater than a threshold level of complexity can cause the low-power controller 120 to activate the high-power controller 110. The sleep mode can include a time and/or alarm. The goal is to save power as much as possible.

For an embodiment, the medium power mode includes sensing motion that shows the device or subject in movement or detection of wireless signature changes (either subject changed location or someone/something approached subject). The location monitoring system wakes up from sleep (timer off, alarm on), and collects more data (motion+wireless with more sampling) and triggers network location or even short periods of GPS (if available). The goal is check whether the location monitoring apparatus should go to the high-power mode or go back to the sleep (low-power) mode.

For an embodiment, the high-power mode includes performing processing of high-power tasks, such as, activating a GPS sensor for some time and submit location data to a controller or upstream server to make a POI (place of interest) detection. The high-power mode may include turning on sonar and/or radar to look at the surrounding environment to detect approaching objects or check the subject moving status. After completion of a task (e.g. get confirmation from the upstream server 150), the location monitoring apparatus 100 may go back to low power mode to sleep.

For an embodiment, communication by the low-power controller 120 with the upstream server 140 is through a wireless link. Accordingly, for an embodiment, the first location monitoring apparatus 100 further includes a radio (not shown) to support the wireless link.

For at least some embodiments, the low-power controller 120 further operates to communicate with a second location monitoring apparatus 102 through, for example, the previously mentioned radio.

For at least some embodiments, the first location monitoring apparatus 100 includes a high-power controller (CPU) 110. For at least some embodiments, the high-power controller operates to retrieve at least a portion of the stored sensed information, process the at least the portion of the stored sensed information, communicate with the low-power controller (through, for example, an internal bus), and communicate with a second low-power controller (MPU) 122 of the second location monitoring apparatus 122 through the low-power controller 120 of the first location monitoring apparatus 100.

For at least some embodiments, the low-power controller 120 is powered and operable for greater periods of time than the high-power controller 110. Further, for at least some embodiments, the low-power controller 120 and the second low-power controller 122 consumes less power than the high-power controller 110. For an embodiment, the low-power controller 120 manages the sensed information even when the high-power controller 110 is not powered and not operational.

As shown in FIG. 1, for at least some embodiments, the second location monitoring apparatus 102 further include sensors (high-power sensors 142, medium power sensors 144, low-power sensors 146), and shared storage 150. For an embodiment, the high-power controller 110 operates to access data of the shared storage 150 of the second location monitoring apparatus through the low-power controller 120 and the second low-power controller 122.

For an embodiment, the low-power controller 120 communicates with the high-power controller only when the high-power controller is powered and operational. For embodiments to be described, the low-power controller 120 monitors motion parameters of the first location monitoring apparatus 100, and controls powering of the high-power controller based on the motion parameters. For an embodiment, the high-power controller is a CPU (central processing unit) and the low-power controller is an MPU (microcontroller unit).

For an embodiment, the high-power controller 110 is further operative to communicate with a second upstream server (not shown in FIG. 1). For an embodiment, a communication channel between the high-power controller 110 and the second server has a greater bandwidth than a communication channel between the low-power controller 120 and the upstream server 150.

For an embodiment, the high-power controller 110 is further operative to receive a request from the second upstream server. For an embodiment, the high-power controller 110 is further operative to re-program the first location monitoring apparatus 100 upon receiving the request from the upstream server 150, including receiving a task of the first location monitoring apparatus 100 and resetting behavior and operation of the low power controller 120.

At least some embodiments of the low-power controller 120 having timing references that are of much lower quality than the high-power controller 110 in order to maintain low-power operation. After a period of time (which may be periodic) the low-power controller can be reset and be recalibrated by the high-power controller 110 in order compensate for the poor clock of the low-power controller 120. If the low-power controller 120 is not reset, the timing errors accumulate causing degraded performance by the low-power controller 120.

The timing of the calibration can be periodic, when the high-power controller 110 is powered up, or upon the low-power controller determining that a reset is needed.

For at least some embodiments, the low-power controller (MPU) 120 is further operative to continuously collect sensor data, process and analyze the collected sensor data, receive instructions from the high-power controller, and update a sensor data collection process based on the received instructions.

For an embodiment, the data collected includes data from the low-power sensor 134 which includes, for example, sensed motion of one or more motion sensors, sensed gyroscope motion, sensed electronic wireless signals (such as, WiFi, Bluetooth, and/or cellular wireless signals). For an embodiment, these low-power sensors perform location estimations offline—meaning that the location monitoring apparatus does not access the upstream server 150.

Upon satisfaction of certain conditions, instructions that operate the low-power controller 120 cause the low-power controller 120 to be reset or rebooted, and the low-power controller 120 provides sensed data to the high-power controller 110, or the high-power controller can access the sensed data in the shared storage 140.

Upon satisfaction of other conditions, instructions of the high-power controller 110 causes the location monitoring apparatus 100 to wakeup and power on, or cause the location monitoring apparatus 100 to go to sleep or power down.

For at least some embodiments, the low power sensor data is collected and processed right away by low-power controller 120, and high-power sensor data is collected after the high-power controller wakes up (activated). The high-power controller 110 then processes all data (low/high power sensor) again all together and performs a high-power task (processing) such as "place detection", "arrival/departure detection", "off-track alarm", "abnormal behavior alarm" and etc.

For at least some embodiments, the low-power controller (MPU) 120 is further operative to control powering up and powering down of the high-power controller 110. For an embodiment, the low-power controller 120 controls powering up and powering down of the high-power controller 110 based on determining sensed motion of the first location monitoring apparatus 100, including powering up the high-power controller 110 when sensing motion of greater than the threshold amount and powering down the high-power controller 110 when sensing motion of less than a threshold amount.

An embodiment includes any one or more of a plurality of low-power controllers of one or more of a plurality of location monitoring apparatuses controlling the powering of the high-power controller based on sensed motion of the first location monitoring apparatus. The high-power controller 110 is similar to high power sensor such as GPS. That is, the high-power controller can be woken up (power activated) by one or more lower power sensors or one or more low-power controllers of one or more location monitoring apparatuses. For example, some certain motion patterns such as driving is can be detected to wake up the high-power controller without wireless signature analysis, but for other motion patterns captured such as walking, the low-power controller may need to further analyze wireless signature in order to decide whether to wake up high-power controller or not.

For at least some embodiments, the low-power controller 120 controls powering up and powering down of the high-power controller 110 based on sensing a motion pattern of the first location monitoring apparatus. That is, rather than activating (powering) the high-power controller based off of just sensed motion, motion patterns can be sensed that indicate an activity or task of the object or device the location monitoring apparatus is attached to. For example, a motion pattern may indicate the object or device is in transit via a vehicle rather than merely being manually moved. The activation of the high-power controller 110 may be required upon detection of a particular motion pattern. Further, for example, if the object or device is a person, the high-power controller may desirably be activated upon sensing the person driving, but not activated upon determining the person is walking. For an embodiment, motion patterns are identified by monitoring motion over a period of time which results in a motion signature. The motion signature can be compared to known motion signatures to identify a motion pattern of a known activity. As described, for an embodiment, the low-power controller activates the high-power controller upon identifying specific motion patterns.

For at least some embodiments, the low-power controller 120 controls powering up and powering down of the high-power controller 110 based on sensing multiple scans of reception of wireless signal signatures. For example, the low-power controller 120 may establish wireless links with devices through a radio within the first location monitoring apparatus 100. As the first location monitoring apparatus 100 changes its location, the possible wireless signals that can be received by the radio of the first location monitoring apparatus 100 may change. A scan involves the first location monitoring apparatus 100 monitoring all wireless signals received at a time. By monitoring different scans at different times, the first location monitoring apparatus 100 can determine motion of the first location monitoring apparatus 100. Accordingly, by comparing the similarity or differences between wireless electronic signal (for example, cellular wireless signals, WiFi wireless signals, Bluetooth wireless signals) scans, the first location monitoring apparatus 100 can determine levels of motion of the first location monitoring apparatus 100, and the low-power controller 120 can control powering of the high-power controller 110 accordingly.

For at least some embodiments, the low-power controller 120 controls powering up and powering down of the high-power controller 110 based on a combination of sensing motion greater than the threshold, sensing of one or more particular motion patterns, and/or sensing of differences in wireless signal reception scans. For an embodiment, the high-power controller 110 is powered upon sensing a combination of any two or more of sensing motion greater than the threshold, sensing of one or more particular motion patterns, and/or sensing of differences in wireless signal reception scans. For an embodiment, the high-power controller 110 is power upon sensing a combination of any two or more of sensing motion greater than the threshold, sensing of one or more particular motion patterns, and/or sensing of differences in wireless signal reception scans in combination with sensing by one or more of the plurality of sensors 130, 132, 134.

For an embodiment, at least some motion analysis can be processed by the low-power controller 120. For an embodiment, if the complexity of the motion processing is greater than a threshold, then the motion analysis (such as, pattern identification) is performed by the high-power controller 110. That is, the high-power controller is activated to perform at least some motion processing if the processing includes motion pattern identification, wherein the motion processing is greater than a threshold (for example, the complexity of the processing is greater than a threshold). The more complex motion pattern processing can include sensing of the characteristics of received wireless signals, and comparisons of the received wireless signals with prior measurements of the reception of wireless signals. That is, measurements of received wireless signals are compared with past reception of wireless signals to aid in the identification of motion and motion patterns.

For at least some embodiments, the low-power controller 120 controls powering up and powering down of the high-power controller 110 based on the low-power controller 120 determining that enough (greater than a threshold) of data has been collected by the plurality of sensors 130, 132, 134 and stored in the shared storage 140. That is, the low-power controller 120 (MPU) has collected enough data and will be over stacked if high-power controller 110 (CPU) doesn't process the data.

For at least some embodiments, the low-power controller 120 activates the high-power controller base on any combination of motion sensing, motion pattern detection, wireless signal reception, or data collection.

Behavior and Operation of the Low-Power Controller

For an embodiment, the low-power controller 120 operates to collect sensor data, mostly motion sensor data and process/analyze some of the data. For an embodiment, the low-power controller (MPU) 120 operates to decode/understand the instructions/commands received from high-power controller (CPU) 110, and chooses different data collecting strategy based on the instructions. As described, for an embodiment, the low-power controller (MPU) 120 also controls (power on/off) of the high-power controller (CPU) 110, by analyzing motion data. For an embodiment, the low-power controller (MPU) 120 operates to turn off the high-power controller (CPU) 110 when zero-motion condition is sensed and operates to turn on the high-power controller (CPU) 110 when motion analysis shows the possibility of location/behavior changes of the first location monitoring apparatus. Additionally, if low-power controller (MPU) 120 has collected "enough" data and needs help from the high-power controller (CPU) 110 for further processing, low-power controller (MPU) 120 will activate the high-power controller (CPU) 110.

For an embodiment, high-power controller 110 may not need to connect directly to the high-power sensors 130, but the high-power controller 110 may instruct the low-power controller 120 to control or connect to the high-power sensors 130.

For at least some embodiments, the high-power controller 110 may not connect directly to the high-power sensors 130, but the high-power controller 110 instruct the low-power controller 120 to control the high-power sensors 130. Therefore, computation or processing by the high-power controller 120 may directly or indirectly reduce the high-power sensor 130 power consumption and reduce the whole system power consumption.

At least some embodiments of the high-power sensors 130 can consume a significant amount of power. For example, the high-power sensor 130 may include satellite-based data communication, and the high-power sensor 130 must be directly activated after analysis by the high-power controller 110 indicating that the satellite-based data communication is really necessary. In this way high-power controller 110 can directly control (via the low-power controller 120) these high-power sensors. In other cases, the high-power controller 110 only provides the low-power controller 120 strategies of controlling the sensors in order to indirectly control sensors.

Figure 2:
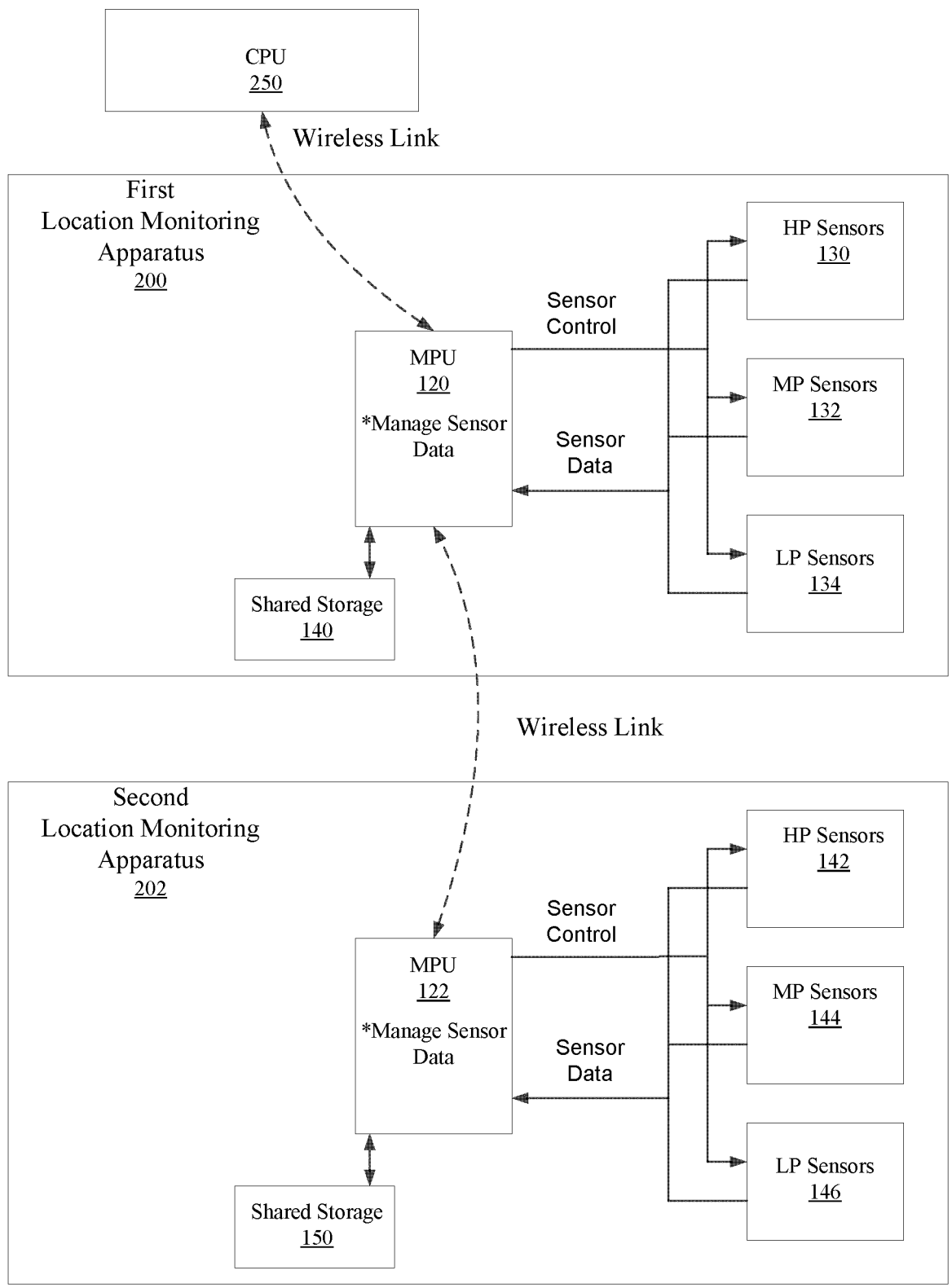
FIG. 2 shows location monitoring apparatuses that are network connected to a high-power controller, according to an embodiment.

FIG. 2 shows location monitoring apparatuses that are network connected to a high-power controller (CPU) 250, according to an embodiment. As shown in FIG. 1, for an embodiment, the high-power controller is located within one of the location monitoring apparatuses. As shown in FIG. 2, for an embodiment, the high-power controller 250 is located external to the location monitoring apparatuses. However, both embodiments include at least some location monitoring apparatuses communicating with the high-power controller 250 through another location monitoring apparatuses.

As described, for at least some embodiments, the low-power controller 120, 122 of each of the location monitoring apparatuses 100, 102 share control of shared storage 140, 142 with the high-power controller 150. For at least some embodiment, if a connection to an upstream server 150 is either too expensive, or the connection to the upstream server 150 has a connection quality below a threshold, the high-power controller can operate to provide at least some of the functionality provided by the upstream server 150.

The first location monitoring apparatus 100 of FIG. 2 includes a direct link (shown as a wireless link) to the high-power controller 250, but the high-power controller 250 is not integrated into the first location monitoring apparatus 200. Otherwise, the location monitoring apparatuses 200, 202 of FIG. 2 operate similarly as the location monitoring apparatuses 100, 102 of FIG. 1.

For an embodiment, the low-power controller (MPU) that includes a high-power controller (CPU) (within the same location monitoring apparatus as shown in FIG. 1, or a direct link exists between the MPU and the CPU as shown in FIG. 2) operates as a master unit location monitoring apparatus while the low-power controller (MPU) without a high-power controller (CPU) operates a slave unit. The CPU doesn't play a role as "master", and its role is more like a "supervisor" or "advisor". For an embodiment, a wireless link exists between the low-power controller (MPU) and the upstream server. For an embodiment, a wireless link exists between the MPU and the CPU, and the CPU unit is a standalone unit that operates as a local "server".

Figure 3A:
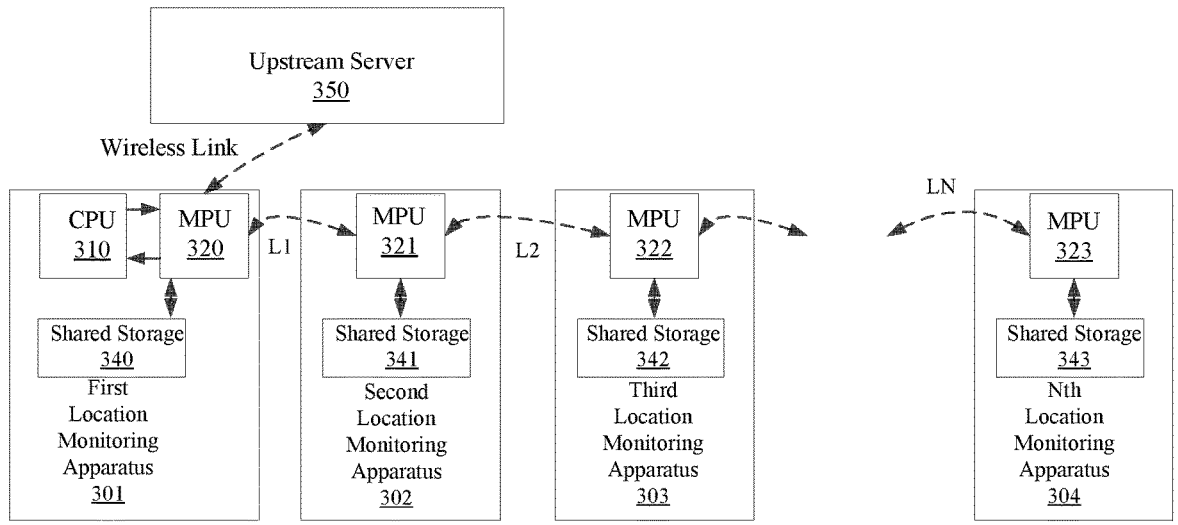
FIG. 3A, 3B show a plurality of location monitoring apparatuses that are network connected to an upstream server, according to an embodiment.
Figure 3B:
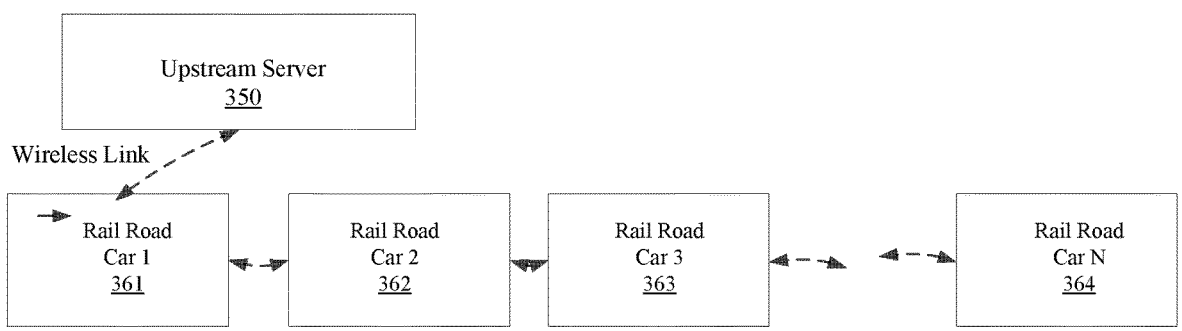

FIG. 3A, 3B show a plurality of location monitoring apparatuses 301, 302, 303, 304, that are network connected to an upstream server 350, according to an embodiment. As shown, the first location monitoring apparatus 301 includes the high-power controller 310, the first low-power controller 320, and shared storage 340. Additionally, the first location monitoring apparatus 301 includes a radio (not shown) that maintains a wireless link to the upstream server 350. Further, the first location monitoring apparatus 301 includes sensors (not shown in FIG. 3), such as, the sensors 130, 132, 134 of FIG. 1.

FIG. 3A further includes a second location monitoring apparatus 302, a third location monitoring apparatus 303, and an Nth location monitoring apparatus 304. The location monitoring apparatuses 302, 303, 304 each include low-power controllers 321, 322, 323, and each includes shared memory 341, 342, 343.

As shown, the location monitoring apparatuses 301, 302, 303, 304 maintain a "daisy chain" wireless link connection L1, L2, LN between each of the location monitoring apparatuses 301, 302, 303, 304 and the upstream server 350. Further, the location monitoring apparatuses 302, 303, 304, maintain a connection between the low-power controllers 321, 322, 323 of the location monitoring apparatuses 302, 303, 304, and the high-power controller 310 of the first location monitoring apparatus 310. Accordingly, the high-power controller 310 of the first location monitoring apparatus 310 maintains some control over each of the low-power controllers 321, 322, 323 of the location monitoring apparatuses 302, 303, 304, and the high-power controller 310 of the first location monitoring apparatus 310 maintains access to the data (sensor data) stored within the shared storage 341, 342, 343 of the low-power controllers 321, 322, 323.

For at least some embodiments, the high-power controller (CPU) 310 has more computing power and can hold and process a more data than the low-power controllers (MPUs) 320, 321, 322, 323. For an embodiment, the high-power controller (CPU) 310 operates as a remote server, and can perform complex computing tasks than the low-power controllers 320, 321, 322, 323, such as "place/visit detection". It is not realistic to implement a modern database system using the low-power controllers 320, 321, 322, 323, but is possible with high-power controller (CPU) 310. For an embodiment, the high-power controller (CPU) 310 operates as a small server. For at least some embodiments, the high-power controller (CPU) 310 connected to a power source and does not have a limit on, for example, battery power, and can collect sensor data without extra cost. The limitless power available to the high-power controller (CPU) 310 can be used to mitigate power consumption of low-power controllers that are within connection range of the high-power controller (CPU) 310. This saves power or cost for location monitoring apparatuses within the wireless range of the high-power controller (CPU) 310. Further, the high-power controller (CPU) 310 can more accurately (due to greater processing power) detect conditions for lower power mode of the location monitoring apparatuses, and notify low-power controllers within the range to enter a lower power mode.

Further, as previously described, for at least some embodiments, the low-power controller 320 maintains control over powering up or powering down the high-power controller 310. For at least some embodiments, the power control is based on sensing of motion of the first motion sensing apparatus 301. However, for at least some embodiments, motion sensing of the location monitoring apparatuses 302, 303, 304 that are located downstream from the high-power controller 310 can operate to control powering of the high-power controller 310 based on sensing of motion, motion patterns, and/or electronic scans of wireless signal reception.

Powering up the high-power controller for monitoring the status (such as location change, movement pattern change, etc.) of the location monitoring apparatuses consumes power. However, the low-power controllers can wake up (power up) and check surrounding environment (such as location change, movement pattern change, etc.) with minimum power cost. When power is limited (that is, the high-power controller does not have power readily available), the high-power controller does not have the ability to check and determine whether/when to exit low power mode. The low-power controllers have longer run times (operational time) than the high-power controller and consume less power when waking up to check surrounding environment of the location monitoring apparatuses.

FIG. 3B shows an embodiment in which railroad cars 361, 362, 363, 364 include are connected through a network of location monitoring apparatus 310, 302, 303, 304 as shown in FIG. 3A. That is, for example, each of the railroad cars 361, 362, 363, 364 may include one of the 310, 302, 303, 304. Accordingly, conditions of each of the railroad cars 361, 362, 363, 364 may be monitored and controlled.

Figure 4:
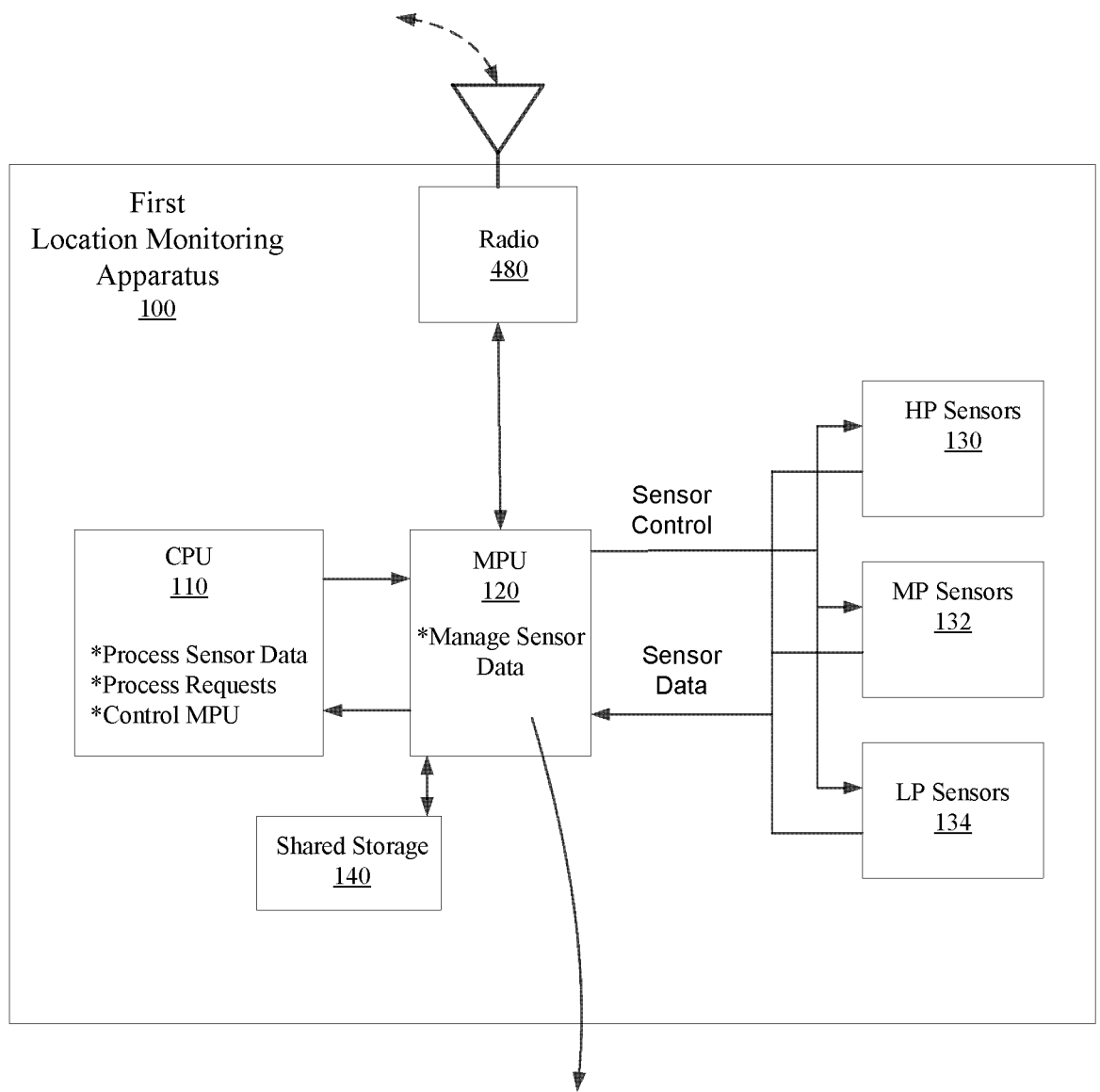
FIG. 4 shows a block diagram of a location monitoring apparatus, in which a low-power controller manages operation of a high-power controller, according to an embodiment.

FIG. 4 shows a block diagram of a location monitoring apparatus, in which a low-power controller manages operation of a high-power controller, according to an embodiment. A radio 480 operates to transmit or receive wireless signals. For an embodiment, the radio 480 facilitates a wireless connection to an upstream server. For an embodiment, the radio 480 facilitates reception of wireless signals from other wireless devices through, for example, a cellular wireless connection, a WiFi (802.11) wireless connection, or through a Bluetooth wireless connection.

As previously described, for at least some embodiments, the low-power controller 120 controls powering up and powering down of the high-power controller 110 based on a combination of sensing motion greater than the threshold, sensing of one or more particular motion patterns, and sensing of differences in wireless signal reception scans. For an embodiment, the high-power controller 110 is power upon sensing a combination of any two or more of sensing motion greater than the threshold, sensing of one or more particular motion patterns, and sensing of differences in wireless signal reception scans. For an embodiment, the high-power controller 110 is power upon sensing a combination of any two or more of sensing motion greater than the threshold, sensing of one or more particular motion patterns, and sensing of differences in wireless signal reception scans in combination with sensing by one or more of the plurality of sensors 130, 132, 134.

Figure 5:
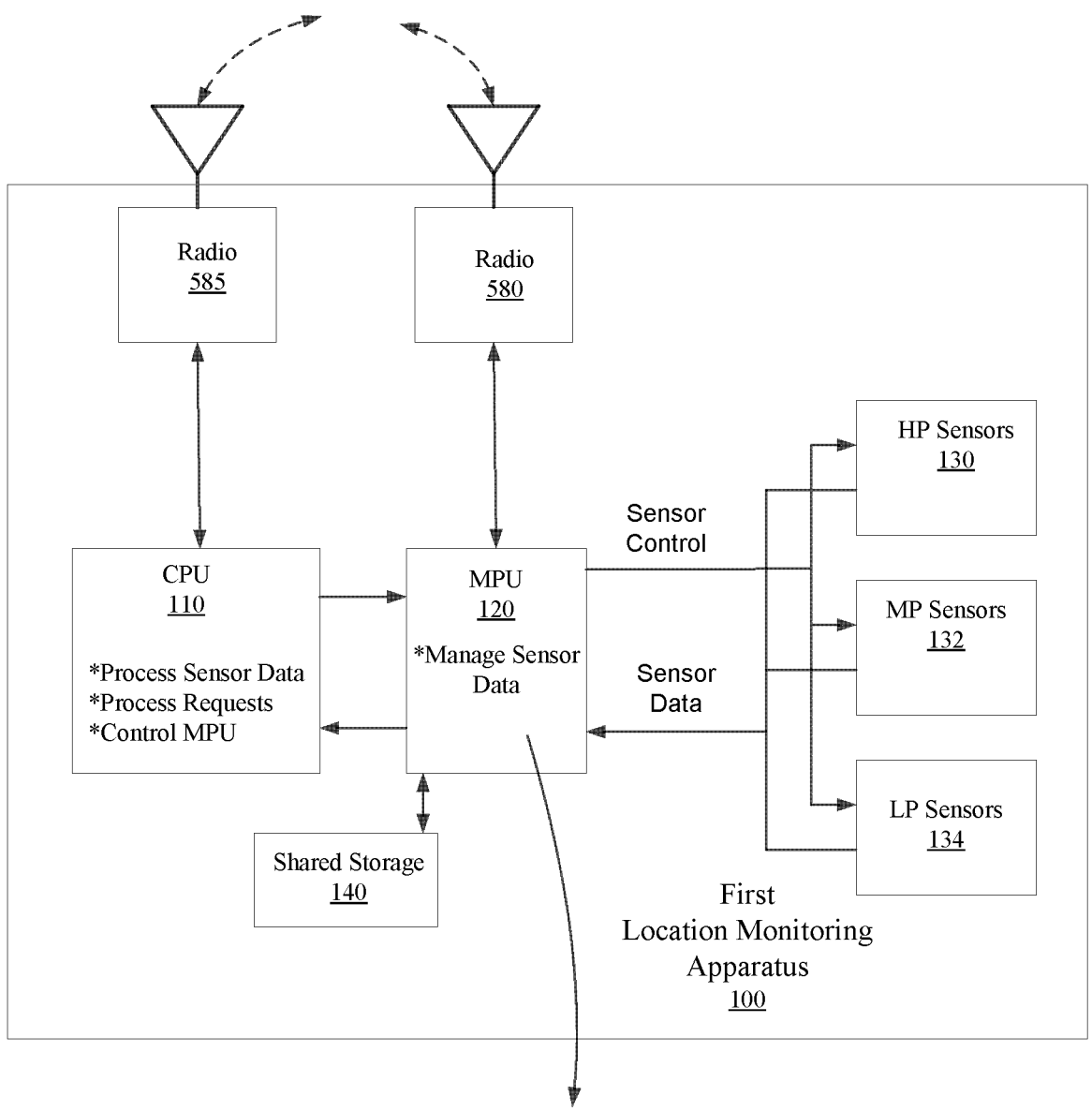
FIG. 5 shows a location monitoring apparatus, wherein a high-power controller and a low-power controller have radios for establishing a wireless connection to an upstream server, according to an embodiment.

FIG. 5 shows a location monitoring apparatus, wherein a high-power controller 110 and a low-power controller 120 have radios for establishing a wireless connection to an upstream server, according to an embodiment. As shown, a radio 585 provides the high-power controller 110 with the ability to maintain another wireless connection to another external device. As shown, a radio 580 provides the low-power controller 120 with the ability to maintain another wireless connection to another external device.

For an embodiment, the plurality of location monitoring apparatuses form a local area network. For an embodiment, the location monitoring apparatus that includes the high-power controller 110 is designated as the master location sensing apparatus, and the other location sensing apparatuses that include the low-power controllers but do not include a high-power controller are designated as the slave location monitoring apparatuses.

For an embodiment, the radio 585 of the high-power controller 110, and/or the radios (such as radio 480, 580) of the low-power controller 120 include long range, low power wireless radios which support long range wireless communication (such as, LoRa). For an embodiment, the radio 580 of the high-power controller 110 of the master location sensing apparatus 100 is set to a master mode, and the radios of the low-power controllers of the slave location monitoring apparatuses are set to a slave mode.

For an embodiment, the master location monitoring apparatus provide at least some functionality of a remote server. For an embodiment, the master location monitoring apparatus provide at least some functionality of a remote server when the connection to the remote server either falls below a performance threshold or exceeds a cost threshold.

For an embodiment, if satellite communication is available (and usually very expensive), and master location sensing apparatus can control an uplink wireless connection via satellite communication. For an embodiment, the high-power controller of the master location sensing apparatus is shared by the multiple low-power controllers of the slave location monitoring apparatuses. For example, multiple low-power controllers (MPUs) can share the processing power of one high-power processor if long rang peer to peer communication is available (such as Narrow Band IoT, or LoRa). Slave location monitoring apparatuses with only low-power controllers (MPU) can pass data via local network to master location sensing apparatus with both a low-power controller (MPU) and a high-power controller (CPU). For example, a train can have many carriages and all carriages have the same moving behavior. The low-power controller (MPU) on each carriage can process its motion and transmit its data to location monitoring apparatus until reaching a master location monitoring apparatus with a high-power controller (CPU).

For at least some embodiments, the location sensing apparatuses with a high-power controller and a low-power controller provides both high processing capability and low power consumption. The high-power controller (CPU) is woken up on demand to analyze data, and low-power controller (MPU) collects data without consuming much power.

For at least some embodiments, uploading the sensed motion data to the upstream server doesn't rely only on the high-power controller (CPU). That is, for at least some embodiments the low-power controller (MPU) uploads data to and downloads simple requests from upstream server directly without high-power controller (CPU). For at least some embodiments, the high-power controller (CPU) handles more complex tasks that low-power controller (MPU) doesn't have the processing power to perform.

For at least some embodiments, the low-power controllers operate to upload/download and process simple data (which doesn't mean the data size, but the complexity) without the high-power controller. However, some complicated tasks may require the one or more of the low-power controllers needing the aid of the high-power controller. For example, accessing a cellular of WiFi location database which enables one or more the location monitoring apparatuses to compute a location based on reception of wireless signals without reaching server, is usually big and sophisticated, and is very difficult to construct. Such complex processing operations may require additional RAM (random access memory). For at least some embodiments, the RAM of the high-power controller is greater than the RAM of the low-power controllers. Additionally, for at least some embodiments, the high-power controller supports a wireless standard that has greater bandwidth than the wireless standards supported by the low-power controllers. Accordingly, the high-power controller may be capable of supporting access to high speed internet to upload/download while the low-power controllers may only be able to support 2G (second generation) or similar low power internet. For some big data sets, it may be impossible or consumes more power (because long duration) to upload/download with 2G or other low power internet than the high-speed internet access provided by the high-power controller. Further, the low-power controllers may not be able to use high speed internet directly because the upload/download speed can exceed the processing speed of the low-power controllers. However, the 2G network has much bigger coverage than high speed (4G/5G/LTE) networks, and therefore, the 2G capabilities of the low-power controller may still be desirable and useful.

Figure 6:
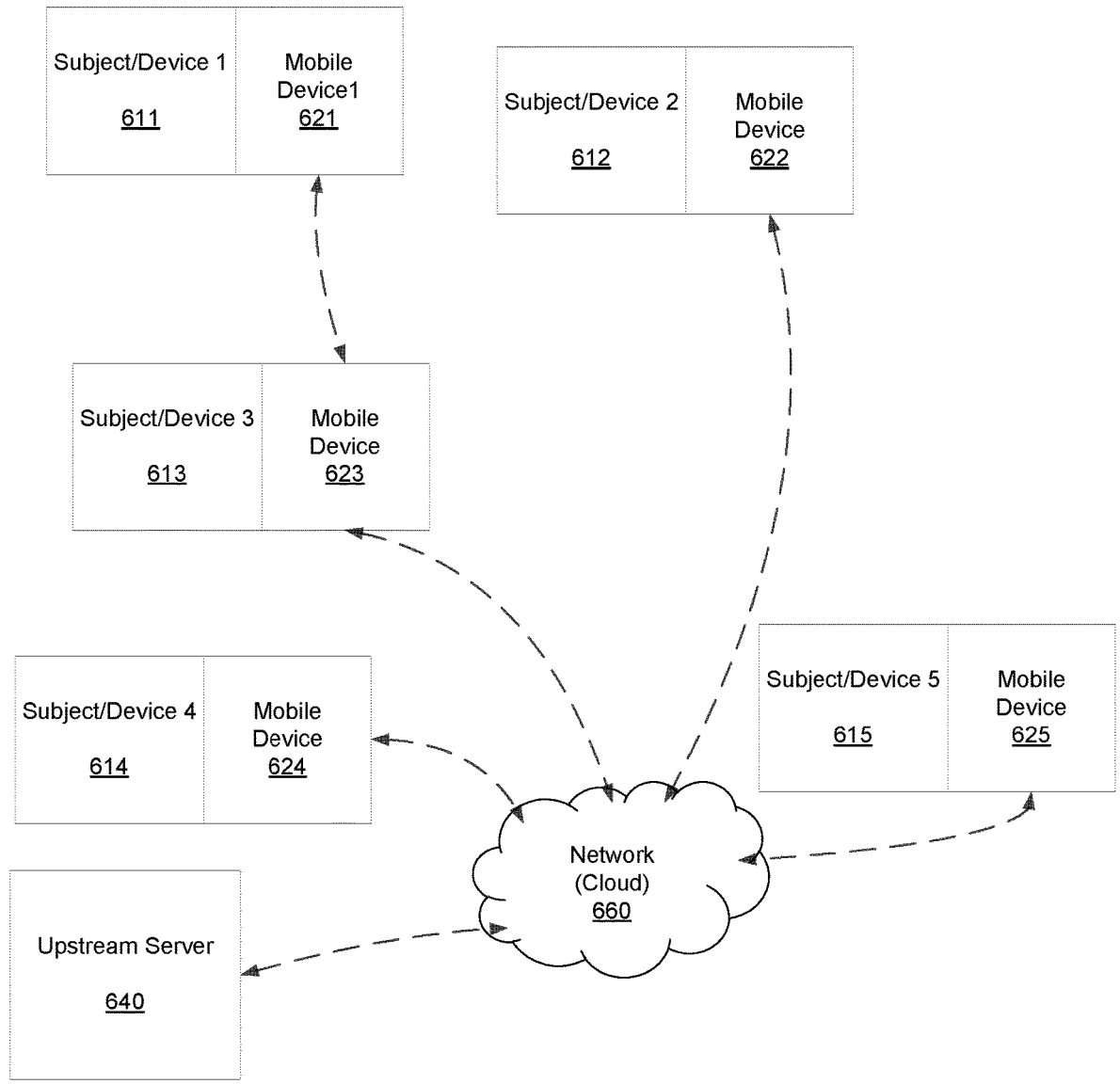
FIG. 6 shows a plurality of subject/devices being monitored by a plurality of location monitoring apparatuses, according to an embodiment.

FIG. 6 shows a plurality of subject/devices being monitored by a plurality of location monitoring apparatuses, according to an embodiment. As shown, each of a plurality of subject/devices 611, 612, 613, 614, 615 have an associated location monitoring device (shown as mobile devices) 621, 622, 623, 624, 625 that are operable to sense motion, location, and/or motion patterns of the subject/devices 611, 612, 613, 614, 615. Each of the location monitoring devices (shown as mobile devices) 621, 622, 623, 624, 625 are connectable to an upstream server 640 through a network 660.

Figure 7:
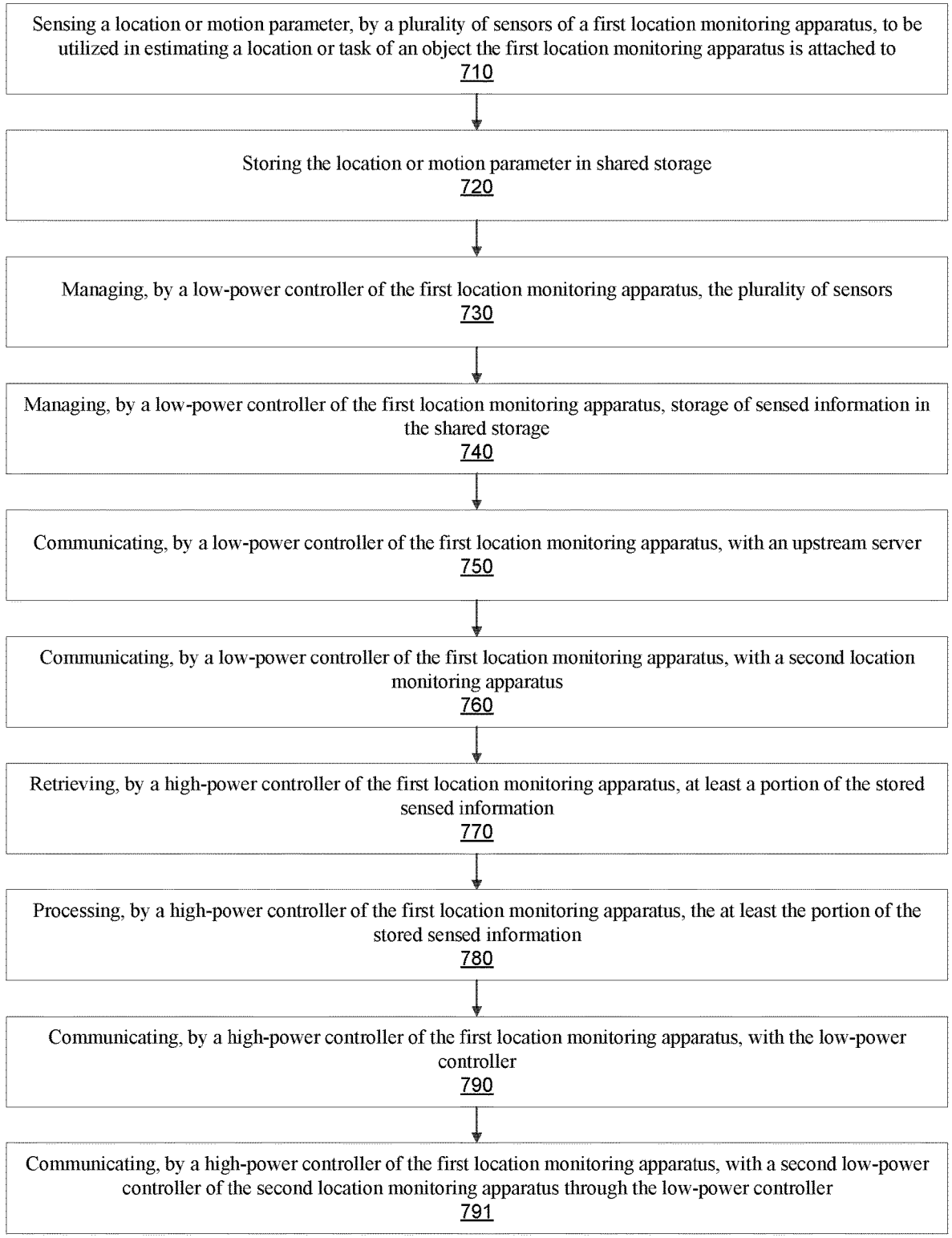
FIG. 7 is a flow chart that includes steps of operation of location monitoring apparatuses, according to an embodiment.

FIG. 7 is a flow chart that includes steps of operation of location monitoring apparatuses, according to an embodiment. A first step 710 include sensing a location or motion parameter, by a plurality of sensors of a first location monitoring apparatus, to be utilized in estimating a location or task of an object the first location monitoring apparatus is attached to. A second step 720 includes storing the location or motion parameter in shared storage. A third step 730 includes managing, by a low-power controller of the first location monitoring apparatus, the plurality of sensors. A fourth step 740 includes managing, by a low-power controller of the first location monitoring apparatus, storage of sensed information in the shared storage. A fifth step 750 includes communicating, by a low-power controller of the first location monitoring apparatus, with an upstream server. A sixth step 760 includes communicating, by a low-power controller of the first location monitoring apparatus, with a second location monitoring apparatus. A seventh step 770 includes retrieving, by a high-power controller of the first location monitoring apparatus, at least a portion of the stored sensed information. An eighth step 780 includes processing, by a high-power controller of the first location monitoring apparatus, the at least the portion of the stored sensed information. A ninth step 790 includes communicating, by a high-power controller of the first location monitoring apparatus, with the low-power controller. A tenth step 791 includes communicating, by a high-power controller of the first location monitoring apparatus, with a second low-power controller of the second location monitoring apparatus through the low-power controller. For an embodiment, the low-power controller is powered and operable for greater periods of time than the high-power controller, and where the low-power controller and the second low-power controller consume less power than the high-power controller.

Figure 8:
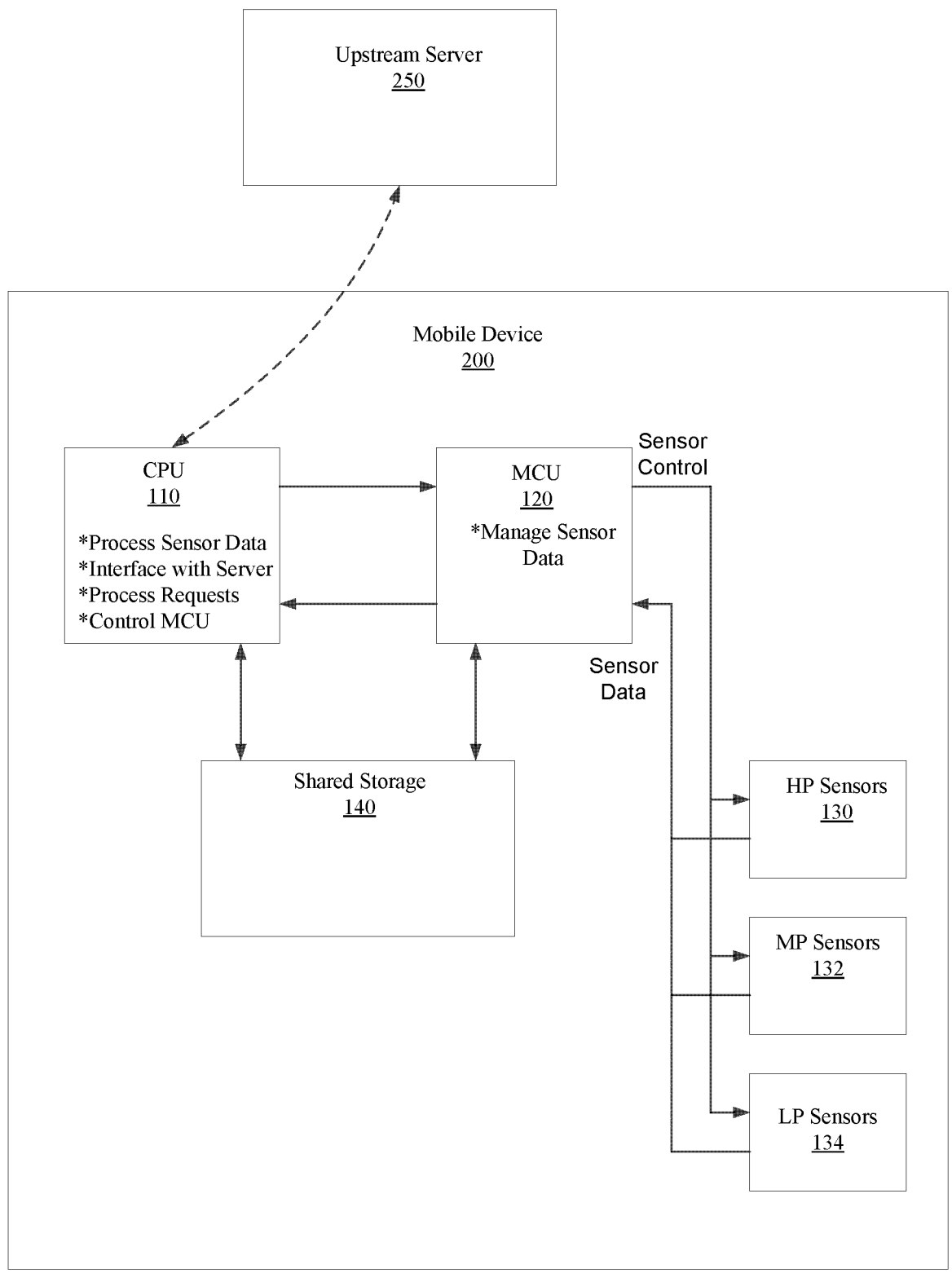
FIG. 8 shows an embodiment of a location monitoring device, according to another embodiment.

FIG. 8 shows an embodiment of a location monitoring device, according to another embodiment. For this embodiment, the high-power controller 110 is connected to the upstream server 250 through, for example, a radio (not shown). All of the low-power controllers of all of the location monitoring apparatuses that are connected or controlled by high-power controller 110 are able to connect to the upstream server 220 through the high-power controller 110.

Figure 9:
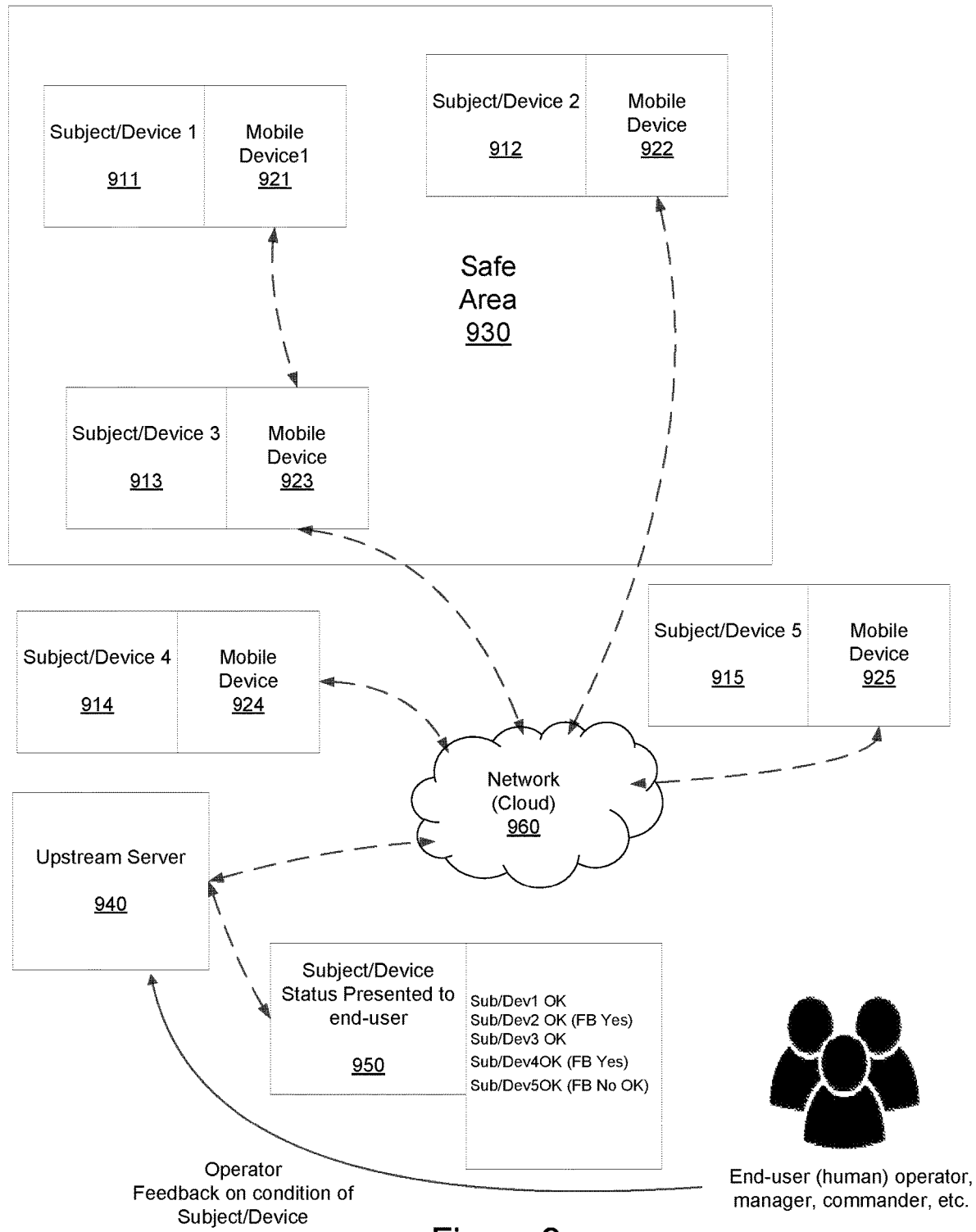
FIG. 9 a plurality of location monitoring devices monitoring locations and behaviors a plurality of subjects, wherein the locations and behaviors are presented to end-users, according to an embodiment.

FIG. 9 shows several subject/devices 911, 912, 913, 914, 915. Each of the subject/devices 911, 912, 913, 914, 915 has a corresponding associated location monitoring apparatus (mobile device) 921, 922, 923, 924, 925. The location monitoring apparatus (mobile device) 921, 922, 923, 924, 925 operate to select a condition of its corresponding associated subject/devices 911, 912, 913, 914, 915. While operating to select the condition of its associated subject/device, the mobile device adaptively controls a tradeoff between computational accuracy and power consumption of the mobile device.

For an embodiment, a location monitoring device (mobile device) 921 operates to receiving a set of predetermined tasks of a subject/device 911 associated with the location monitoring device (mobile device) 921. The location monitoring device (mobile device) 921 further operates to selectively activating a plurality of sensors of the location monitoring device (mobile device) 921 based on the set of predetermined tasks. Further, a location of the location monitoring device (mobile device) 921 is estimated by one or more sensors of the selectively activated plurality of sensors of the location monitoring device (mobile device) 921. Once activated, sensed information of the location monitoring device (mobile device) 921 is sensed by the plurality of selectively activated sensors. The location monitoring device (mobile device) 921 or an upstream network 960 (or a combination of location monitoring device (mobile device) 921 and the upstream network 960) operate to select a condition of the subject/device 911 based on the estimated location, the set of predetermined tasks, and the sensed information of the plurality of selectively activated sensors.

As previously described, and as shown in FIG. 9, each of the plurality of mobile devices 911, 912, 913, 914, 915 operate to select a condition of its corresponding associated subject/devices 911, 912, 913, 914, 915. Accordingly, for an embodiment, conditions of one or more of the plurality of subject/devices 911, 912, 913, 914, 915 are selected by the plurality of mobile devices 921, 922, 923, 924, 925, or by the plurality of mobile devices 921, 922, 923, 924, 925 in conjunction with the upstream server 940, or by the upstream server 940 based on information receive from the plurality of mobile devices 921, 922, 923, 924, 925.

For at least some embodiments, the plurality of mobile devices 921, 922, 923, 924, 925 further monitor and coordinate each of the plurality of subjects or plurality of devices. For at least some embodiments, the monitoring and coordinating of the subject/devices includes monitoring and coordinating that prisoners or mental patients stay in a controlled area (such as, a safe area 930), and cannot run away. The sensors can include absolute (GPS) coordinates for outdoor tracking, and relative (e.g. relative to beacons whose position is accurately known) coordinates for indoor location tracking. Further, for at least some embodiments, the monitoring and coordinating of the subject/devices includes monitoring and coordinating that vehicles stay on track as planned. Further, for at least some embodiments, the monitoring and coordinating of the subject/devices includes monitoring and coordinating that a box/pilot of goods is lifted or moved by authorized person or machine.

A embodiment includes a system (such as formed by the mobile devices 911, 912, 913, 914, 915, and/or network 960, and/or upstream server 940) that includes a network of heterogeneous devices which can coordinate among themselves (either in a master-slave mode, or peer-to-peer mode) to monitor and communicate locations and conditions of each of the subjects/devices, in order to provide monitoring of certain subjects/devices to a set of end-users 950.

For at least some embodiment, the subject/devices 911, 912, 913, 914, 915 being monitored includes machines or equipment that are managed by property-management logistics (e.g. shipping containers, generators, expensive minerals/resources), or people who are required to be monitored (e.g. workers for safety concerns, outdoor prisoners, or medicated patients), or high valued animals and live stocks.

At least some embodiments further include reporting the condition of the subject or the device, including determining whether the subject or the device are successfully performing a particular set of tasks, comprising reporting whether the subject or the device is safe, whether the subject or the device is on schedule, whether the subject or the device is still within control. For at least some embodiments, data of each subject/device is monitored and collected to determine subject's condition in order to determine if the subjects are successful performing certain tasks. For a specific embodiment, this includes binary decision tasks in order to reduce data exchange between users and the subjects. Examples include is the subject is in a safe environment or not, is the subject on-schedule or not, is the subject still under or within a controlled region or not.

At least some embodiments include reporting the condition of the subject or the device to users as shown by presenting the subject/device status to end-users 150. Further, at least some embodiment further includes receiving feedback from the users regarding accuracy of the selected condition, and determining false positive identification of the reported condition of the subject or the device. An exemplary list is shown in FIG. 1 that includes sub/dev1 OK, sub/dev2 OK—and feedback (FB) from the end-users indicates that the OK status for sub/dev2 is a yes that indicates the OK status is correct, sub/dev3 OK, sub/dev4 OK—and feedback (FB) from the end-users indicates that the OK status for sub/dev4 is a yes that indicates the OK status is correct, sub/dev5 OK—and feedback (FB) from the end-users indicates that the OK status for sub/dev4 is a no that indicates the OK status is incorrect.

For at least some embodiments, as shown in FIG. 9, false positive identification is included from human verification (e.g. observed from command center, or from a master device which is capable of verifying and recording ground truth). Separate tools and systems to allow for false negative observations are also necessary to increase overall detection accuracy. For an embodiment, a set of users can provide feedback for the mobile devices and take care of both false positives/negatives. True positives can be sampled in order to improve the overall system detection accuracy.

At least some embodiments further include detecting a place of the subject/device based on the estimated location, the condition of the subject/device, and the sensed information of the plurality of selectively activated sensors of the corresponding mobile device. Specifically, at least some embodiments include tracking and/or monitoring a location of a mobile device that is operating as a tracking device for tracking the location of the subject/device. For a specific embodiment, the tracking device tracks progress of a shipping vehicle, such as, a railroad car or boat that is progressing along railroad tracks or along a river.

At least some embodiments further include reselecting which of the plurality of sensors of the mobile device are activated based on the condition of the device.

For at least some embodiments, selectively activating the plurality sensors of the mobile device includes selecting a sampling rate of one or more of the plurality of selectively activated sensors. For at least some embodiments, estimating, by one or more sensors of the selectively activated plurality of sensors of the mobile device, a location of the mobile device comprises estimating the location at a rate set by the sampling rate.

At least some embodiments further include ignoring the possibility of the subject or a device being in a condition that is not on the set of predetermined tasks.

At least some embodiments further include selecting the condition of the subject or a device based on a sensed acceleration, magnetic field, received RF signals (WiFi), received GPS signals, or rotation of the mobile device.

At least some embodiments further include dynamically updating the selected sensed information based on the condition of the subject or a device.

At least some embodiments further include determining one or more locations of the mobile device based on the condition of the subject or a device.

At least some embodiments further include monitoring how long the subject or a device operates in one or more tasks of the set of predetermined tasks. A least some embodiments further include presenting a sequence of the monitored one or more tasks of the set of predetermined tasks of the subject or a device to an operator or the user.

For at least some embodiments a task includes a condition of the subject or a device.

Although specific embodiments have been described and illustrated, the embodiments are not to be limited to the specific forms or arrangements of parts so described and illustrated.

What is claimed:

1. A location monitoring system, comprising:
    a first location monitoring apparatus, comprising
        a plurality of sensors, each of the plurality of sensors sensing a location or motion parameter to be utilized in estimating a location or task of an object the location monitoring apparatus is attached to;
        shared storage;
        a low-power controller operative to:
            manage the plurality of sensors;
            manage storage of sensed information in the shared storage;
            communicate with an upstream server through a first wireless connection of a first radio connected to the low-power controller;
            communicate with a second location monitoring apparatus;
        a high-power controller, the high-power controller operative to:
            retrieve at least a portion of the stored sensed information;
            process the at least the portion of the stored sensed information;
            communicate with the low-power controller;
            communicate with a second low-power controller of the second location monitoring apparatus through the low-power controller,
            communicate with a second external device through a second wireless connection of a second radio connected to the high-power controller;
        wherein the low-power controller is powered and operable for greater periods of time than the high-power controller, and wherein the low-power controller and the second low-power controller consume less power than the high-power controller.

2. The location monitoring system of claim 1, wherein the the second external device comprises a second upstream server, wherein a communication channel of the second wireless connection between the high-power controller and the second server has a greater bandwidth than a communication channel of the first wireless connection between the low-power controller and the upstream server.

3. The location monitoring system of claim 2, wherein the high-power controller is further operative to:
    receive a request from the second upstream server.

4. The location monitoring system of claim 3, wherein the high-power controller is further operative to:
    re-program the first location monitoring apparatus upon receiving the request from the second upstream server, including receiving a task of the location monitoring apparatus and resetting behavior and operation of the low power controller.

5. The location monitoring system of claim 1, wherein the low-power controller (MPU) is further operative to:
    continuously collect sensor data;
    process and analyze the collected sensor data;
    receive instructions from the high-power controller;
    update a sensor data collection process based on the received instructions.

6. The location monitoring system of claim 1, wherein the low-power controller (MPU) is further operative to:
    control powering up and powering down of the high-power controller.

7. The location monitoring system of claim 6, wherein the low-power controller controls powering up and powering down of the high-power controller based on determining sensed motion of the first location monitoring apparatus, including powering up the high-power controller when sensing motion of greater than the threshold amount and powering down the high-power controller when sensing motion of less than a threshold amount.

8. The location monitoring system of claim 6, wherein the low-power controller controls powering up and powering down of the high-power controller based on sensing a motion pattern of the first location monitoring apparatus, wherein the location monitoring system is attached to an object or device, and wherein the sensed motion pattern indicates a type of transit of the object or device.

9. The location monitoring system of claim 6, wherein the low-power controller controls powering up and powering down of the high-power controller based on multiple scans of reception of wireless signal signatures, wherein each scan includes monitoring all wireless signals received at a time over different times, and further includes comparing similarity or differences between types of wireless signals of each of multiple scans over the different times.

10. The location monitoring system of claim 6, wherein the low-power controller controls powering up and powering down of the high-power controller based on a combination of any two or more of sensing motion greater than the threshold, sensing of one or more particular motion patterns, or sensing of differences in wireless signal reception scans.

11. The location monitoring system of claim 6, wherein the low-power controller controls powering up and powering down of the high-power controller based on sensing a combination of sensing motion greater than the threshold, sensing of one or more particular motion patterns, and sensing of differences in wireless signal reception scans in combination with sensing by one or more of the plurality of sensors.

12. The location monitoring system of claim 6, wherein the low-power controller controls powering up and powering down of the high-power controller based on the low-power controller determining that greater than a threshold of data has been collected by the plurality of sensors and stored in the shared storage.

13. The location monitoring system of claim 1, further comprising a plurality of location monitoring apparatuses including at least the first location monitoring apparatus and the second location monitoring apparatus, wherein each of the plurality of location monitoring apparatuses include a low-power controller, and wherein one or more of the low-power controllers indirectly provides location and motion data to the high-power controller through an intermediate low-power controller of intermediate location monitoring apparatuses.

14. The location monitoring system of claim 13, wherein the plurality of location monitoring apparatuses includes a master location monitoring apparatus that includes the high-power controller, and the plurality of location monitoring apparatuses include slave location monitoring apparatuses that include a low-power controller but do not include the high-power controller.

15. The location monitoring system of claim 14, wherein the high-power controller of the master location monitoring apparatus performs at least some upstream server functionality when a network connection to the upstream server falls below a performance threshold or exceeds a cost threshold.

16. The location monitoring system of claim 15, wherein the location monitoring apparatus that includes the high-power controller includes a the second radio, wherein the second radio supports a satellite wireless link and the high-power controller is operative to communicate with the upstream server through the satellite wireless link when the high-power controller determines a condition has been satisfied.

17. The location monitoring system of claim 3, wherein the high-power controller is further operative to:
retrieve and process at least a portion of the stored sensed information upon receiving the request from the second upstream server;
provide the processed at least the portion of the stored sensed information to the upstream server.

18. The location monitoring system of claim 1, wherein the high-power controller is further operative to process the at least the portion of the stored sensed information includes the high-power controller operative filter an amount of the stored sensed information based on resources available for communicating the processed stored sensed information to the upstream server.

19. A method of location monitoring, comprising:
sensing a location or motion parameter, by a plurality of sensors of a first location monitoring apparatus, to be utilized in estimating a location or task of an object the first location monitoring apparatus is attached to;
storing the location or motion parameter in shared storage;
managing, by a low-power controller of the first location monitoring apparatus, the plurality of sensors;
managing, by a low-power controller of the first location monitoring apparatus, storage of sensed information in the shared storage;
communicating, by a low-power controller of the first location monitoring apparatus, with an upstream server through a first wireless connection of a first radio connected to the low-power controller;
communicating, by a low-power controller of the first location monitoring apparatus, with a second location monitoring apparatus;
retrieving, by a high-power controller of the first location monitoring apparatus, at least a portion of the stored sensed information;
processing, by a high-power controller of the first location monitoring apparatus, the at least the portion of the stored sensed information;
communicating, by a high-power controller of the first location monitoring apparatus, with the low-power controller;
communicating, by a high-power controller of the first location monitoring apparatus, with a second low-power controller of the second location monitoring apparatus through the low-power controller;
communicating, by the high-power controller of the first location monitoring apparatus, with a second external device through a second wireless connection of a second radio connected to the high-power controller;
wherein the low-power controller is powered and operable for greater periods of time than the high-power controller, and wherein the low-power controller and the second low-power controller consume less power than the high-power controller.

* * * * *